United States Patent
Olsson et al.

(10) Patent No.: US 8,144,650 B2
(45) Date of Patent: Mar. 27, 2012

(54) METHOD AND ARRANGEMENT RELATING TO COMMUNICATIONS NETWORK SERVICES REQUEST ACTIVATION

(75) Inventors: Lasse Olsson, Stenungsund (SE); Jan Backman, Kärna (SE); Peter Jason, Ytterby (SE); Per Svedberg, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 281 days.

(21) Appl. No.: 12/520,657

(22) PCT Filed: Dec. 22, 2006

(86) PCT No.: PCT/EP2006/012465
§ 371 (c)(1),
(2), (4) Date: Jun. 22, 2009

(87) PCT Pub. No.: WO2008/077423
PCT Pub. Date: Jul. 3, 2008

(65) Prior Publication Data
US 2010/0061386 A1 Mar. 11, 2010

(51) Int. Cl.
*H04W 4/00* (2009.01)
*H04L 12/28* (2006.01)
(52) U.S. Cl. ........................ 370/328; 370/401
(58) Field of Classification Search .......... None
See application file for complete search history.

(56) References Cited

U.S. PATENT DOCUMENTS

| | | | | |
|---|---|---|---|---|
| 6,763,233 | B2* | 7/2004 | Bharatia | 455/433 |
| 7,061,894 | B2* | 6/2006 | Pang et al. | 370/338 |
| 7,324,483 | B2* | 1/2008 | Lee | 370/335 |
| 7,457,275 | B2* | 11/2008 | Zhao | 370/342 |
| 2003/0081607 | A1* | 5/2003 | Kavanagh | 370/392 |
| 2005/0237969 | A1* | 10/2005 | Jung et al. | 370/328 |
| 2005/0249238 | A1* | 11/2005 | Haumont | 370/466 |
| 2006/0050667 | A1* | 3/2006 | Verma et al. | 370/338 |
| 2007/0213058 | A1* | 9/2007 | Shaheen | 455/436 |
| 2008/0014956 | A1* | 1/2008 | Balasubramanian | 455/452.1 |
| 2010/0027541 | A1* | 2/2010 | Eriksson et al. | 370/390 |
| 2010/0322068 | A1* | 12/2010 | Grahn et al. | 370/217 |

OTHER PUBLICATIONS

"One Tunnel Functional description (Release 7)"; 3GPP TR 23.809 V1.0.0; Sep. 2006; pp. 1-50 XP002449389.
"Change Request: Direct Tunnel functionality" 3GPP TSG-SA2 Meeting #55; Oct. 23; pp. 1-67 XP002449388.

* cited by examiner

*Primary Examiner* — Robert Scheibel
*Assistant Examiner* — Hicham Foud
(74) *Attorney, Agent, or Firm* — Roger S. Burleigh

(57) ABSTRACT

A method of services request in a packet switched telecommunications network comprising a Gateway GPRS Support Node (GGSN) arranged for communication with a Serving GPRS Support Node (SGSN). During activation of a subscriber session, receiving by the GGSN, from the SGSN in an Update PDP Context Request message, data comprising both 1) an Internet Protocol (IP) address and user plane tunnelling endpoint identifier (TEID) for a Radio Network Controller (RNC) and 2) an IP address and user plane TEID of the SGSN; the GGSN nominally utilizes the IP address and TEID of the RNC for the subscriber session. If an error indication is received by the GGSN indicating that the RNC has restarted, it discards the IP address and TEID corresponding to the RNC and utilizes the IP address and TEID corresponding to the SGSN, whereby the GGSN and SGSN can maintain the subscriber session in the event of an RNC restart.

6 Claims, 4 Drawing Sheets

METHOD AND ARRANGEMENT RELATING TO COMMUNICATIONS NETWORK SERVICES REQUEST ACTIVATION

TECHNICAL FIELD

The present invention relates to telecommunications network and system and especially to wireless packet switched communications systems.

BACKGROUND OF THE INVENTION

In the near future, the feature One Tunnel Solution/Direct Tunnel (OTS/DT) will be introduced into 3GPP. However, there are no real solutions to the problems regarding Error Indication handling.

The procedure that will most likely be used during Error Indication scenarios when DT/OTS is active is either Network Initiated Service Request (using Protocol Data Unit (PDU) Notification) or Gateway GPRS Support Node (GGSN) Initiated Packet Data Protocol (PDP) Context modification.

When using the proposed PDU Notification procedure combined with DT/OTS also a critical state machine is introduced in the GGSN, between steps 2 and 7 in FIG. 1. FIG. 1 illustrates signalling diagram for the Network Initiated Service Request Procedure which is used for reestablishment of RABs and the steps comprise:

1) The GGSN receives a downlink PDP PDU for a User Equipment (UE) in PMM-IDLE state.
2) The GGSN sends a PDU Notification Request message to the SGSN related to the PDP context. The SGSN returns a PDU Notification Response (Cause) message to the GGSN in order to acknowledge that it requests the UE to re-activate the PDP context(s).
3) The SGSN sends a Paging message to the Radio Network Controller (RNC). The RNC pages the UE by sending a Paging message to the UE.
4) The UE sends a Service Request message to the SGSN. Service Type specifies
5) The SGSN performs a security mode procedure.
6) If resources for the PDP contexts are to be re-established, the SGSN sends a Radio Access Bearer Assignment Request (including RAB ID(s), GGSN TEID(s), QoS Profile(s), GGSN IP Address(es)) message to the RNC.
7) Having received the IP address(es) and the TEID(s) from the RAN the SGSN sends an Update PDP Context Request (including RAN Address, RAN TEID, QoS Negotiated) message to each GGSN concerned. Each GGSN updates its PDP context fields and returns an Update PDP Context Response (TEID) message. The tunnel between RAN and the GGSN is re-established.
8) The GGSN sends the downlink packet.

The existing problems include:
The proposed procedure will use unnecessary signalling capacity over Gn, which can cause overload of the backbone.
Risk of overloading the GGSN when having the proposed Update PDP Context Request bursts.
Risk of overloading the Serving GPRS Support Node (SGSN) when handling the proposed Update PDP Context Request bursts.
Risk of losing downlink payload packets before the SGSN and GGSN are synchronised.

SUMMARY OF THE INVENTION

The present invention provides a method and arrangement to solve the above mentioned problems. Other advantageous of the invention may include:
Possibility of allowing optimization of the signaling for OTS/DT, so that implicit Radio Access Bearer (RAB) preservation can be done without moving the tunnel end-point (from GGSN p-o-w) between SGSN and RNC.
Make it possible to handle Error Indication in an intelligent way from GGSN. Presently, no known solutions exist.
No dropped payload packets during the reestablishment procedure.
Moreover, the present invention improves DT/OTS as well as it optimizes Gn and GGSN resources. The present invention also provides for a network initiated service request, which may only happen "on demand" and allows the PDP Context in both SGSN and GGSN to be available after RNC restarts. Moreover, the additional load on Gn is spread over time without having any implementation to keep track of it (throttling).

For these reasons a method is provided for services request in a packet switched telecommunications network. The network comprises a first server arranged to communicate with a second server. The method comprises: during activation of a subscriber's session information receiving by the first server data comprising two sets of tunnelling endpoint identifiers and IP addresses, and discarding one set of the tunnelling endpoint identifiers and IP addresses corresponding to a network controller. Most preferably, the first server is a Gateway GPRS Support Node, GGSN, and the second server is a Service GPRS Support Node, SGSN. The subscriber's session information comprises Packet Data Protocol, PDP, Context and the network controller is a Radio Network Controller, RNC.

Preferably, if the SGSN simultaneously receives a failure signal from the RNC and Radio Access Bearers, RAB, and connecting interface to the controllers are removed, the RAB is released internally in the SGSN. The method further comprises receiving a downlink payload packet by the GGSN and transmitting the packet to SGSN. The SGSN detects absence of RAB and applying a legacy handling procedure. According to the method a RAB Assignment Request is send to the network controller and the GGSN including in the request user plane tunnel end identifier and IP Address. When an RAB Assignment Response is received from the RNC, the GGSN is updated with the SGSN and RNC user plane TEIDs and IP Addresses using an Update PDP Context Procedure.

The invention also relates an arrangement for use in a communications network node comprising a processing unit for handling communication data and communication control information a memory), and an interface unit and communication units, each having a respective connecting interface. The interface unit is arranged to receive data comprising two sets of tunnelling endpoint identifiers and IP addresses during activation of a subscriber's session information during an active session receiving by the server data comprising two sets of tunnelling endpoint identifiers and IP addresses, and the processing unit being arranged to process and discard one set of the tunnelling endpoint identifiers and IP addresses relating to a network controller. The arrangement is thus a Gateway GPRS Support Node. The arrangement is arranged as an interface between a GPRS backbone network and an external packet data networks and being arranged to converts GPRS packets coming from a SGSN into appropriate packet data protocol, PDP, format and having means for sending the packets out on a corresponding packet data network and the processing unit being arranged to convert PDP addresses of incoming data packets to the address of a destination user and further comprising means for storing current SGSN address of the user and profile in its location register. The arrangement further comprises a functional unit for performing authentication and charging functions.

The invention also relates to a an arrangement for use in a communications network node comprising a processing unit for handling communication data and communication control information a memory, and an interface unit and communication units, each having a respective connecting interface. A communication arrangement is provided for communicating its tunnel endpoint identity and IP address to Gateway GPRS Support Node together with Radio Network Controller tunnel endpoint identity and IP address. Thus the arrangement is a Serving GPRS Support Node, SGSN. The arrangement is arranged as for the delivery of data packets from and to a user equipment within its geographical service area and packet routing and transfer, mobility management, logical link management, and authentication and charging functions. The arrangement may have a register for storing location information and user profiles used in the packet data network of all users registered with this SGSN.

The invention also relates to a telecommunication infrastructure node comprising a Gateway GPRS Support Node, GGSN, arranged to communicate with a Serving GPRS Support Node, SGSN, the GGSN being arranged to handle data from an external network and the SGSN being arranged to handle communication with a user equipment (MS). The GGSN is arranged to receive an activation PDP Context comprising two sets of tunnelling endpoint identifiers and IP addresses, and the GGSN being arranged to discard one set of the tunnelling endpoint identifiers and IP addresses corresponding to a network controller and use the other set of tunnelling endpoint identifiers and IP addresses corresponding to the SGSN.

The invention may be implemented as hardware or a software application, and thus the invention relates to a computer program for use in service request in a packet switched telecommunications network. The network comprises a first server arranged to communicate with a second server. The first server is arranged to handle data from an external network and the second server being arranged to handle communication with a user equipment. The computer program comprises: an instruction set for receiving data comprising two sets of tunnelling endpoint identifiers and IP addresses during activation of a subscriber's session information, and an instruction set for discarding one set of the tunnelling endpoint identifiers and IP addresses corresponding to a network controller.

BRIEF DESCRIPTION OF THE DRAWINGS

The present invention will be described with reference to some non-limiting embodiments illustrated in attached drawings, in which.

DETAILED DESCRIPTION OF PREFERRED EMBODIMENTS

Figure 1:
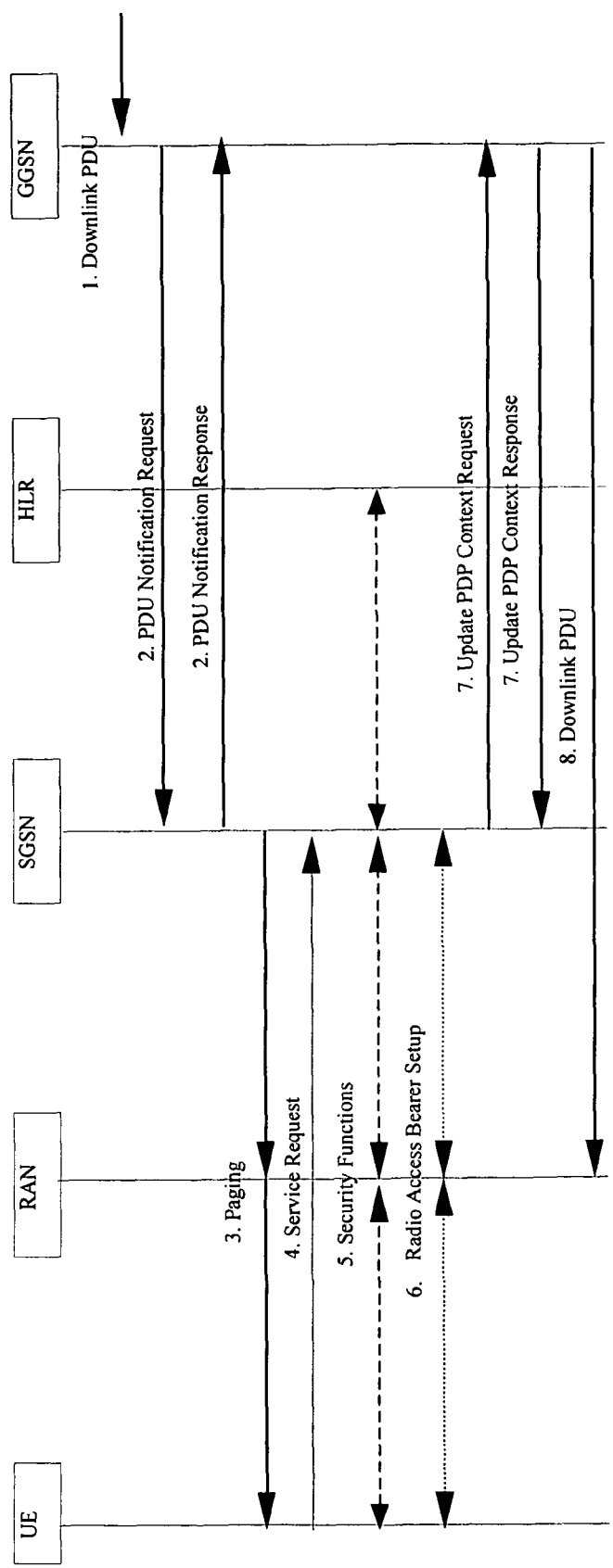
FIG. 1 is Network Initiated Service Request Procedure.
Figure 2:
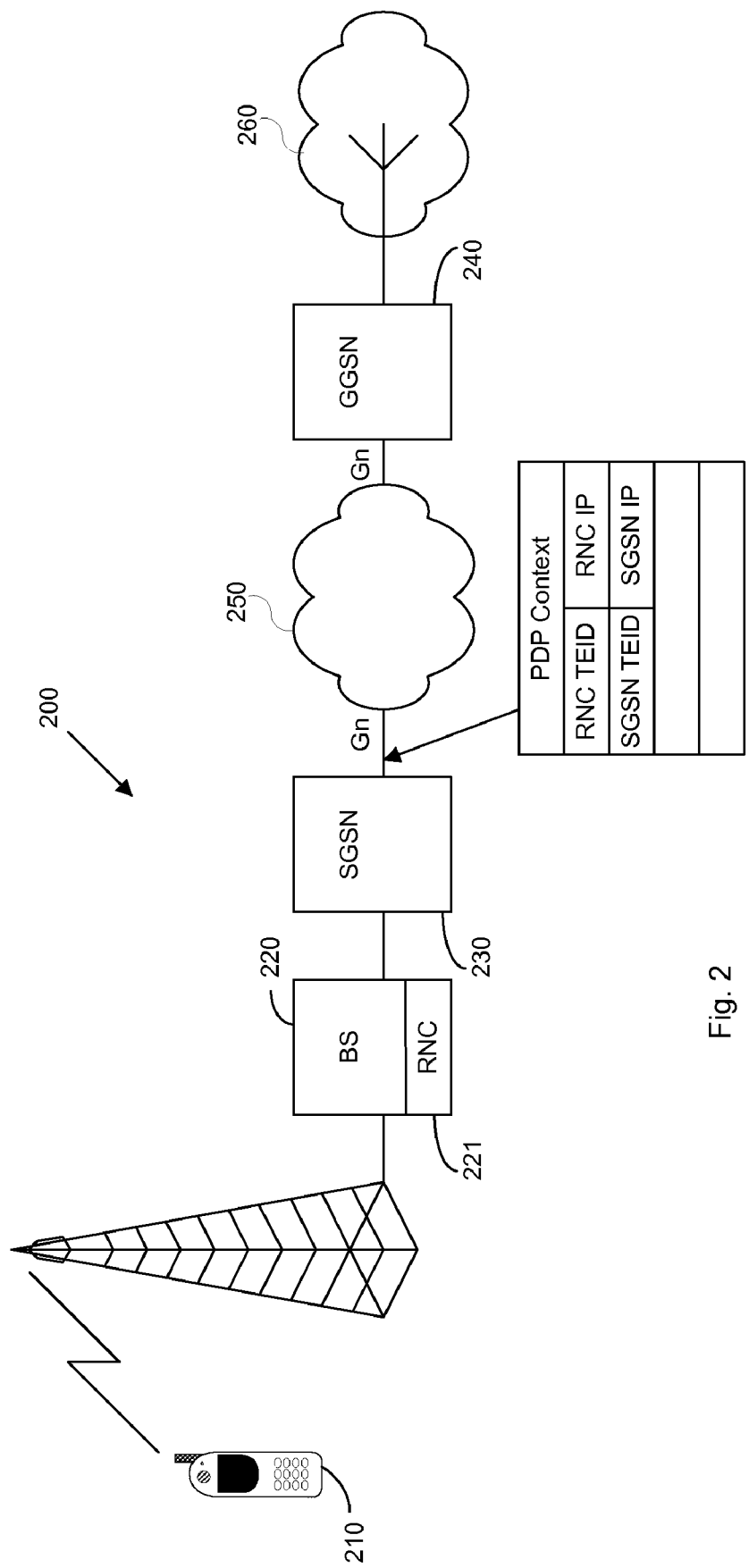
FIG. 2 is a schematic network diagram.

FIG. 2 illustrates a schematic of a communications network 200, comprising a Mobile Station (MS) 210, a network base station 220 including RNC 221, a SGSN server 230, GGSN Gateway 240, connecting network 250 and communication network 260.

Figure 3:
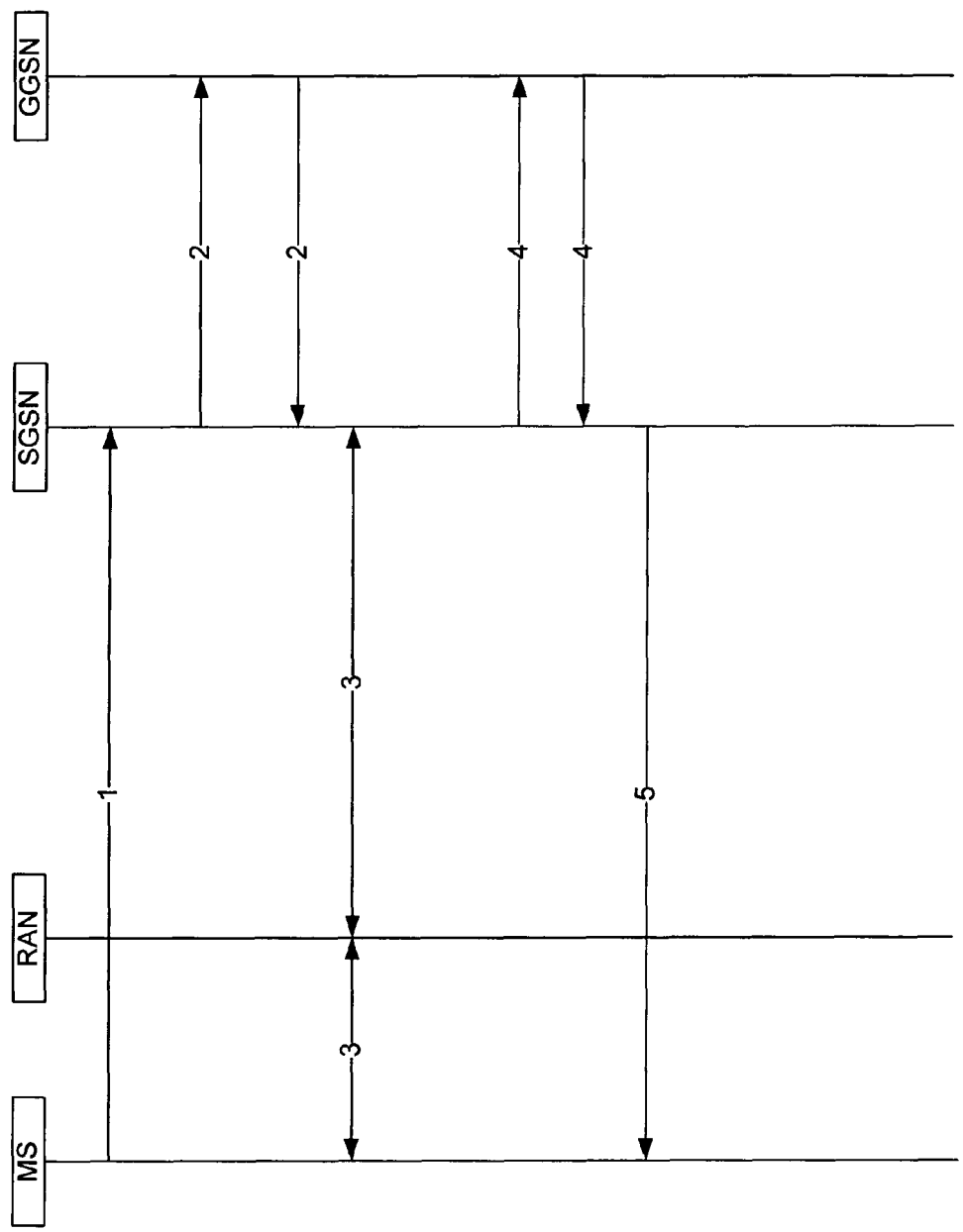
FIG. 3 is a PDP Context Activation Procedure for Iu mode according to the invention.

According to the present invention, during the Activate PDP Context Procedure, the RNC user plane Tunnel Endpoint Identifier (TEID) and IP Address are communicated together with the SGSN user plane TEID and IP Address in the Update PDP Context Request to GGSN. The steps are illustrated in the signalling diagram of FIG. 3 (and described in conjunction with FIG. 2). In this example, the steps comprise Iu mode:

1) The MS 210 sends an Activate PDP Context Request message to the SGSN 230. The MS may use PDP Address to indicate whether it requires the use of a static PDP address or whether it requires the use of a dynamic PDP address. The MS may use Access Point Name to select a reference point to a certain packet data network and/or to select a service. Access Point Name is a logical name referring to the packet data network and/or to a service that the subscriber wishes to connect to QoS Requested indicates the desired QoS profile. Protocol Configuration Options may be used to transfer optional PDP parameters and/or request to the GGSN 240.

If the SGSN decides to establish Direct Tunnel between RNC 221 and GGSN, the SGSN provides the Direct Tunnel specific parameters to the RNC in step 3 "RAB Assignment Procedure" and initiates PDP Context Update procedure in step 4 to update IP Address and TEID for Downlink data in the GGSN.

2) The SGSN validates the Activate PDP Context Request using PDP Type (optional), PDP Address (optional), and Access Point Name (optional) provided by the MS and the PDP context subscription records.

If no GGSN address can be derived or if the SGSN has determined that the Activate PDP Context Request is not valid according to the rules, the SGSN rejects the PDP context activation request.

If a GGSN address can be derived, the SGSN creates a TEID for the requested PDP context. The SGSN may restrict the requested QoS attributes given its capabilities and the current load, and it may restrict the requested QoS attributes according to the subscribed QoS profile.

The SGSN sends a Create PDP Context Request message to the affected GGSN. The SGSN sends the serving network identity to the GGSN. Access Point Name is the APN Network Identifier of the APN selected according to the procedure. The GGSN may use Access Point Name to find a packet data network and optionally to activate a service for this APN. Selection Mode indicates whether a subscribed APN was selected, or whether a non-subscribed APN sent by an MS or a non-subscribed APN chosen by the SGSN was selected. The GGSN may use Selection Mode when deciding whether to accept or reject the PDP context activation. For example, if an APN requires subscription, the GGSN is configured to accept only the PDP context activation that requests a subscribed APN as indicated by the SGSN with Selection Mode. Charging Characteristics indicates which kind of charging the PDP context is liable for. A Maximum APN Restriction denotes the most stringent restriction as required by any already active PDP contexts. If there are no already active PDP contexts, this value is set to the least restrictive type. If the GGSN receives the Maximum APN Restriction, then the GGSN checks if the Maximum APN Restriction value does not conflict with the APN Restriction value associated with this PDP context request. If there is no conflict the request is allowed, otherwise the request is rejected with the SGSN sending a PDP Context Activation Reject Message to the MS including an appropriate error cause. NRS indicates SGSN support of the network requested bearer control. The SGSN only indicates that it supports the procedure if it supports it and the MS has previously also indicated that it supports it to the SGSN in the Activate PDP Context Request message as described above.

The GGSN creates a new entry in its PDP context table and generates a Charging Id. The new entry allows the GGSN to route PDP PDUs between the SGSN and the packet data network, and to start charging. The GGSN may restrict QoS Negotiated given its capabilities and the current load. The GGSN then returns a Create PDP Context Response (TEID, PDP Address, Protocol Configuration Options, QoS Negotiated, Charging Id, Prohibit Payload Compression, APN Restriction, Cause, CGI/SAI/RAI change report required, BCM) message to the SGSN. The Prohibit Payload Compression indicates that the SGSN should negotiate no data compression for this PDP context. PDP Address is included if the GGSN allocated a PDP address. If the GGSN has been configured by the operator to use External PDN Address Allocation for the requested APN, PDP Address may be set to, e.g. 0.0.0.0, indicating that the PDP address is negotiated by the MS with the external PDN after completion of the PDP Context Activation procedure. The GGSN relays, modifies and monitors these negotiations as long as the PDP context is in ACTIVE state, and uses the GGSN-Initiated PDP Context Modification procedure to transfer the currently used PDP address to the SGSN and the MS. Protocol Configuration Options contain optional PDP parameters that the GGSN may transfer to the MS. These optional PDP parameters may be requested by the MS in the Activate PDP Context Request message, or may be sent unsolicited by the GGSN. Protocol Configuration Options is sent transparently through the SGSN. The Create PDP Context messages are sent over the backbone network.

If QoS Negotiated received from the SGSN is incompatible with the PDP context being activated, the GGSN rejects the Create PDP Context Request message. The GGSN operator configures the compatible QoS profiles.

If an APN Restriction is received from the GGSN for this PDP Context, then the SGSN stores this value for the PDP Context and the SGSN checks this received value with the stored value for the Maximum APN Restriction to ensure there are no conflicts between values. If the consequence of this check results in the PDP context is rejected, the SGSN initiates a PDP Context Deactivation and return an appropriate error cause. If the PDP Context is accepted, it determines a (new) value for the Maximum APN Restriction. If there is no previously stored value for Maximum APN Restriction, then the Maximum APN Restriction is set to the value of the received APN Restriction.

The GGSN derives the BCM based on NRS and operator policy, and MS-preferred Bearer Control Mode if previously received in the Create PDP Context Request message. The derived BCM is sent to the MS indicating the Bearer Control Mode applicable to all PDP Contexts within the activated PDP Address/APN pair.

3) RAB setup is done by the RAB Assignment procedure,
4) In case the QoS attributes have been downgraded, the SGSN may inform the GGSN about the downgraded QoS attributes by sending an Update PDP Context Request to the affected GGSN. Update PDP Context Request also comprises RAN Tunnel Endpoint Identifier Data and RAN (IP) Address for User Traffic. The GGSN confirms the new QoS attributes by sending an Update PDP Context Response to the SGSN. If the SGSN established Direct Tunnel in step 3, it also sends Update PDP Context Request and includes the RNC's Address for User Plane and TEID for downlink data as well as the SGSN TEID and IP Address and DTI to instruct the GGSN to apply Direct Tunnel specific error handling.

5) The SGSN inserts the NSAPI along with the GGSN address in its PDP context. If the MS has requested a dynamic address, the PDP address received from the GGSN is inserted in the PDP context. The SGSN selects Radio Priority and Packet Flow Id based on QoS Negotiated, and returns an Activate PDP Context Accept message to the MS. If the MS indicated in the MS Network Capability it does not support BSS packet flow procedures, then the SGSN does not include the Packet Flow Id.

Tunnel Endpoint Identifier Data and RAN Address for User Traffic may also be used to inform the GGSN that OTS/DT is active on this PDP Context.

The reason for being able to remove the network initiated Service Request or SGSN initiated Update PDP Context Request is as follows:

1. If the RNC restarts and OTS/DT is active the Error Indication is sent to the GGSN which since it has two TEID's (one for the RAN and one for the SGSN) and IP Addresses assigned to the PDP Context (although only using one at a time) can deduct that it was the RNC who sent the message.
2. The GGSN can then discard the TEID/IP Address in use (pointing towards the RNC) and instead switch to the second pair (pointing towards the SGSN) without any need for signalling at all.
3. Simultaneously the SGSN receives the reset signal from the RNC that something has gone wrong and that the RAB's and Iu's are removed. The RAB's are internally released in the SGSN.
4. A downlink payload packet arrives to the GGSN and this packet will be passed on to the SGSN.
5. The SGSN discovers that no RAB exist and legacy handling is applied.
6. When RAB Assignment Request is sent to the RNC, the GGSN user plane TEID and IP Address is included.
7. When RAB Assignment Response is received from the RNC, the GGSN is updated with the SGSN and RNC user plane TEID and IP Address once again using the Update PDP Context Procedure.

Figure 4:
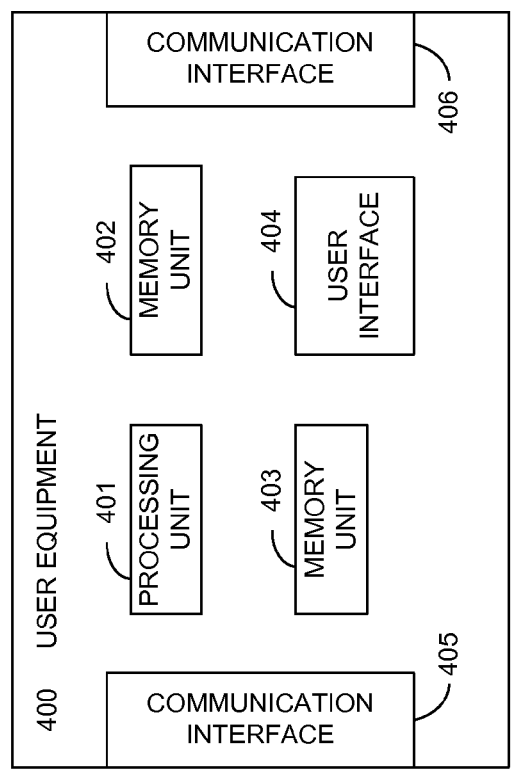
FIG. 4 illustrates a block diagram over a user-equipment.

FIG. 4 illustrates in a schematically block diagram user equipment 400 according to the present invention. A processing unit 401 (e.g. a processor) is arranged to run instruction sets for operating the communication part of the equipment. The processor 401 in turn may use at least one memory unit 402, 403 of volatile or non-volatile solution (e.g. RAM or flash memory). A user interface unit 404 may interact with a user of the equipment using any suitable type of user interface equipment (e.g. a keyboard, a keypad and/or other types of buttons or even a voice controlled solution). The user equipment 400 may be arranged with a communication interface 405 for communicating with a communication network via a communication gateway and it may further be arranged with a separate communication interface 406 for communicating with external or internal unit or devices; for instance if the user equipment 400 is part of a laptop the separate communication interface may be connected to internal laptop processing and communication parts for mediating information between the communication network and any application in the laptop.

The instruction set(s) may be inserted into the equipment at production time, downloaded using the wireless communication link to the telecommunication network, or downloaded using another link to a communication network, such as for instance but not limited to a synchronization link between the mobile phone and a PC (not shown), a TCP/IP link between a laptop and a communication network (e.g. the Internet), and a wireless link (e.g. using at least one of Bluetooth, 802.11, 802.15, or 802.16 series of wireless communication protocols) between a PDA and a PC in turn connected for instance to the Internet.

Figure 5:
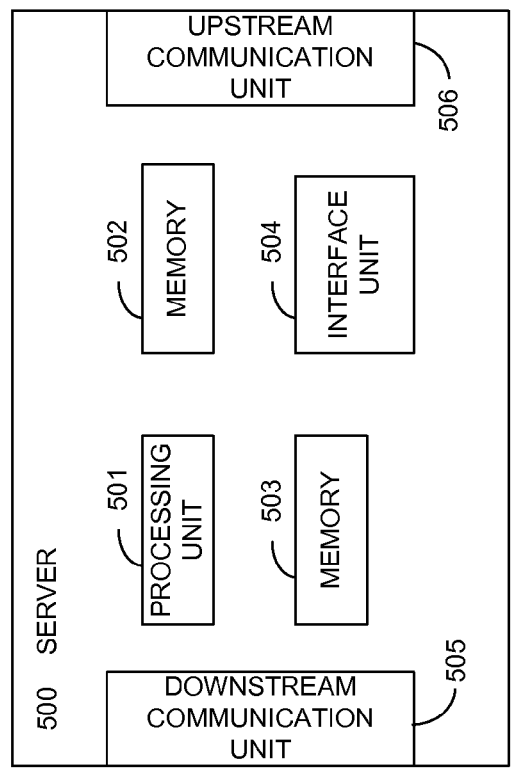
FIG. 5 illustrates a block diagram over a network server.

FIG. 5 illustrates in a schematic block diagram an infrastructure node (server) according to the present invention, (GGSN or SGSN) in which a processing unit 501 handles communication data and communication control information. The infrastructure node 500 further comprises a volatile (e.g. RAM) 502 and/or non volatile memory (e.g. a hard disk or flash memory) 503, and an interface unit 504. The infrastructure node 500 may further comprise a downstream communication unit 505 and an upstream communication unit 506, each with a respective connecting interface (not shown). All units in the infrastructure node can communicate with each other directly or indirectly through the processing unit 501. Software for handling communication to and from the mobile units attached to the network is at least partly executed in this node and may be stored in the node as well; however, the software may also be dynamically loaded upon start of the node or at a later stage during for instance a service interval. The software can be implemented as a computer program product and distributed and/or stored on a removable computer readable media, e.g. diskette, CD (Compact Disk), DVD (Digital Video Disk), flash or similar removable memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

The GGSN acts as an interface between the GPRS backbone network and the external packet data networks (radio network and the IP network). It converts the GPRS packets coming from the SGSN into the appropriate packet data protocol (PDP) format (e.g. IP or X.25) and sends them out on the corresponding packet data network. In the other direction, PDP addresses of incoming data packets are converted to the address of the destination user. The readdressed packets are sent to the responsible SGSN. For this purpose, the GGSN comprises arrangement for storing the current SGSN address of the user and his or her profile in its location register. The GGSN also performs authentication and charging functions. The GGSN according to the present invention further comprises means (software or hardware) to carry out the teachings of the invention, i.e. an interface unit in the GGSN is arranged to receive data comprising the two sets of TEID and IP address from SGSN and RNC, and process and discard one set of TEID and IP address relating to RNC as mentioned earlier.

The SGSN is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with this SGSN.

It should be noted those terms specific for special network standards are given as examples in the embodiments and similar wordings for entities and items having same functionality are not excluded from the invention.

The invention claimed is:

1. A method of services request in a packet switched telecommunications network, said network comprising a Gateway GPRS Support Node (GGSN) arranged for communication with a Serving GPRS Support Node (SGSN), the method comprising:

during activation of a subscriber session, receiving by said GGSN, from said SGSN in an Update PDP Context Request message, data comprising both 1) an Internet Protocol (IP) address and user plane tunnelling endpoint identifier (TEID) for a Radio Network Controller (RNC) and 2) an IP address and user plane TEID of said SGSN, said GGSN nominally utilizing the IP address and TEID of said RNC for said subscriber session; and, if an error indication is received by said GGSN indicating that said RNC has restarted, discarding said IP address and TEID corresponding to said RNC and utilizing said IP address and TEID corresponding to said SGSN, whereby said GGSN and SGSN can maintain said subscriber session in the event of an RNC restart.

2. The method according to claim 1, wherein if said SGSN receives a failure signal from said RNC, releasing a Radio Access Bearer (RAB) assignment previously established internally in said SGSN.

3. The method according to claim 2, further comprising receiving a downlink payload packet by said GGSN and transmitting said packet to said SGSN.

4. The method according to claim 3, wherein said SGSN detects the absence of said RAB and applies a legacy handling procedure.

5. The method according to claim 4, further comprising sending a RAB Assignment Request to said RNC and said GGSN, including in said request a user plane tunnel endpoint identifier (TEID) and IP Address.

6. The method according to claim 5, wherein when an RAB Assignment Response is received from said RNC, said GGSN is updated with said SGSN and RNC user plane TEIDs and IP Addresses using an Update PDP Context Procedure.

* * * * *

UNITED STATES PATENT AND TRADEMARK OFFICE
CERTIFICATE OF CORRECTION

PATENT NO.         : 8,144,650 B2
APPLICATION NO.    : 12/520657
DATED              : March 27, 2012
INVENTOR(S)        : Olsson et al.

It is certified that error appears in the above-identified patent and that said Letters Patent is hereby corrected as shown below:

In Column 2, Line 53, delete "memory)," and insert -- memory, --, therefor.

In Column 3, Line 8, delete "a an" and insert -- an --, therefor.

In Column 3, Line 29, delete "(MS)." and insert -- (UE). --, therefor.

In Column 3, Line 55, delete "is" and insert -- is a --, therefor.

In Column 5, Line 60, delete "procedure," and insert -- procedure. --, therefor.

Signed and Sealed this
Twenty-sixth Day of June, 2012

David J. Kappos
*Director of the United States Patent and Trademark Office*